(12) United States Patent
Amari

(10) Patent No.: US 9,889,756 B2
(45) Date of Patent: Feb. 13, 2018

(54) VEHICLE

(71) Applicant: HONDA MOTOR CO., LTD., Tokyo (JP)

(72) Inventor: Yusaku Amari, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/050,634

(22) Filed: Feb. 23, 2016

(65) Prior Publication Data

US 2016/0243950 A1 Aug. 25, 2016

(30) Foreign Application Priority Data

Feb. 25, 2015 (JP) ................................. 2015-034983

(51) Int. Cl.
*B60L 11/18* (2006.01)

(52) U.S. Cl.
CPC ......... *B60L 11/182* (2013.01); *Y02T 10/7005* (2013.01)

(58) Field of Classification Search
CPC ............................. B60L 11/182; Y02T 10/7005
See application file for complete search history.

(56) References Cited

U.S. PATENT DOCUMENTS

| | | | | |
|---|---|---|---|---|
| 5,669,470 | A * | 9/1997 | Ross | B60L 5/005 191/10 |
| 6,421,600 | B1 * | 7/2002 | Ross | B60L 5/005 180/167 |
| 7,374,000 | B2 * | 5/2008 | Yamamoto | B60K 6/44 180/243 |
| 9,623,767 | B2 * | 4/2017 | Imazu | B60L 11/182 |
| 9,649,948 | B2 * | 5/2017 | Bell | B60L 11/1831 |
| 2010/0161216 | A1 * | 6/2010 | Yamamoto | B60L 11/182 701/408 |
| 2011/0082612 | A1 * | 4/2011 | Ichikawa | B60L 11/182 701/22 |
| 2012/0187773 | A1 * | 7/2012 | Wechlin | B60L 11/182 307/104 |
| 2013/0278212 | A1 * | 10/2013 | Kai | B60L 11/182 320/108 |
| 2014/0039728 | A1 * | 2/2014 | Imazu | B60L 11/182 701/2 |
| 2014/0139181 | A1 * | 5/2014 | Elias | B60L 11/1811 320/108 |

(Continued)

FOREIGN PATENT DOCUMENTS

JP 2003-191809 A 7/2003

*Primary Examiner* — Frederick Brushaber
(74) *Attorney, Agent, or Firm* — Westerman, Hattori, Daniels & Adrian

(57) ABSTRACT

A drive over estimating unit of an electric vehicle estimates whether or not wheels of the vehicle will drive over a power supplying coil, e.g., power supplying pad, from a stopped position estimation value, e.g., a deviation amount in a direction of positional shifting of the electric vehicle with respect to the power supplying pad, and a steering angle (−θ (left) or +θ (right)) when the vehicle starts to move after non-contact charging thereof is completed. A notification unit issues a notification when it is estimated that the wheels of the electric vehicle will drive over the power supplying coil, e.g., power supplying pad.

8 Claims, 14 Drawing Sheets

+θ : RIGHT STEERING ON
FORWARD START OF MOVEMENT

(56) References Cited

U.S. PATENT DOCUMENTS

| | | | |
|---|---|---|---|
| 2014/0239735 A1* | 8/2014 | Abe | B60L 3/0069 307/104 |
| 2014/0372077 A1* | 12/2014 | Templ | B60L 5/005 702/182 |
| 2016/0052405 A1* | 2/2016 | Koizumi | H02J 5/005 320/108 |
| 2016/0332572 A1* | 11/2016 | Gibeau | B60R 1/00 |

* cited by examiner

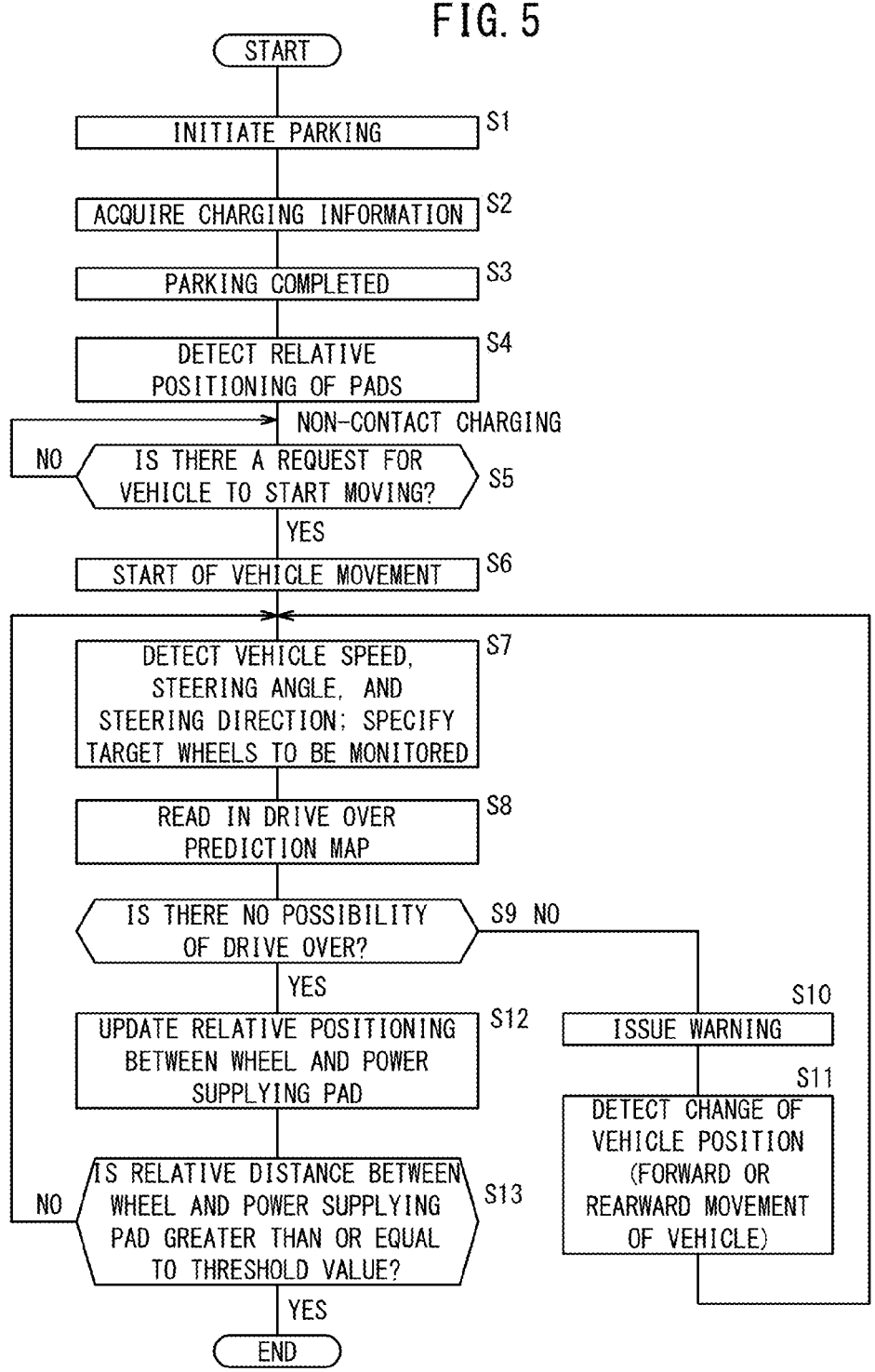

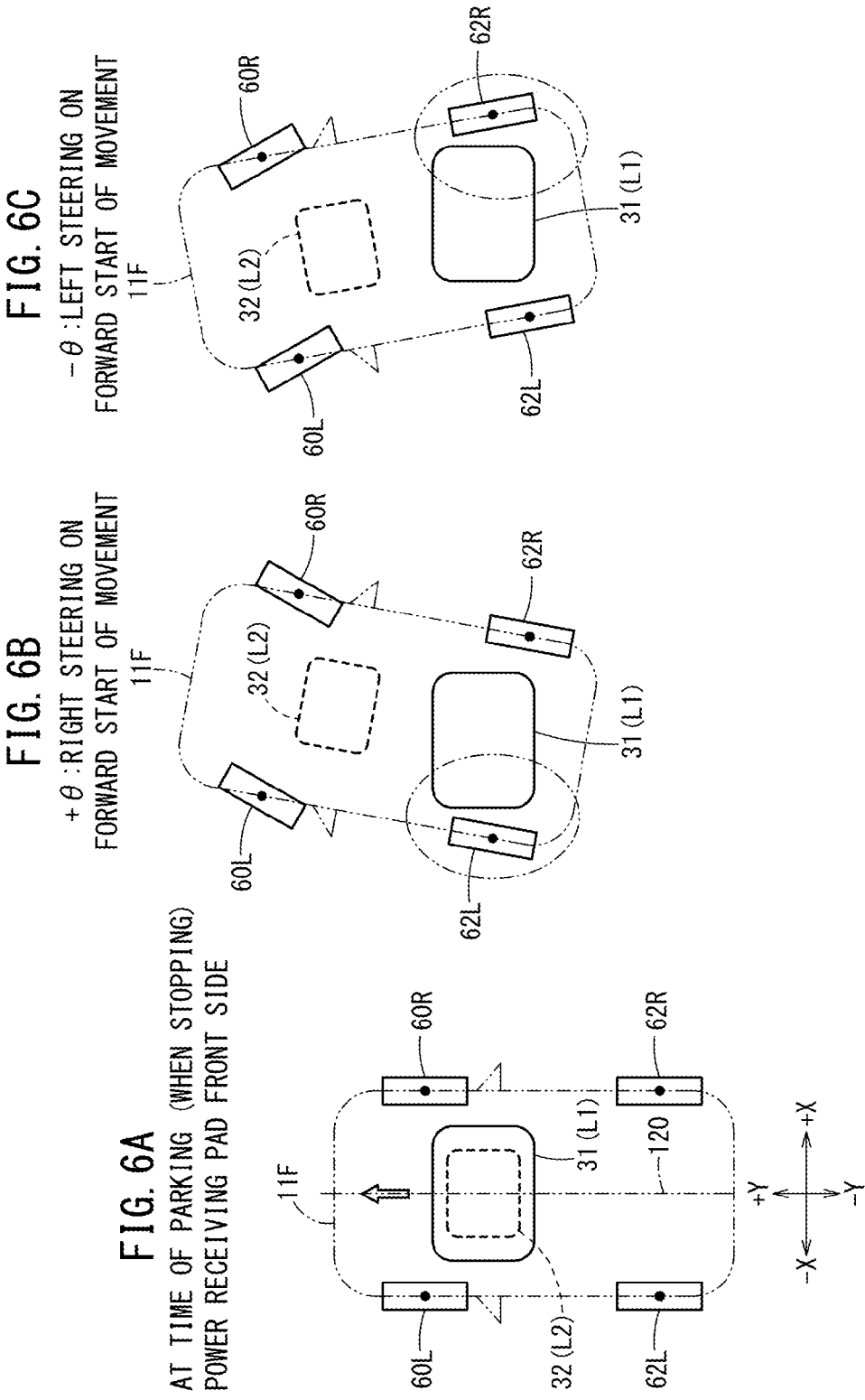

−θ: LEFT STEERING ON REARWARD START OF MOVEMENT

+θ: RIGHT STEERING ON REARWARD START OF MOVEMENT

AT TIME OF PARKING (WHEN STOPPING) POWER RECEIVING PAD REAR SIDE

FIG. 8
POWER RECEIVING PAD FRONT SIDE & ON FORWARD START OF MOVEMENT

| AT TIME OF FORWARD MOVEMENT | LEFT FRONT WHEEL | RIGHT FRONT WHEEL | LEFT REAR WHEEL | RIGHT REAR WHEEL |
|---|---|---|---|---|
| $+\theta$ (STEERING WHEEL TURNED TO RIGHT) | − | − | MONITORING TARGET | − |
| $-\theta$ (STEERING WHEEL TURNED TO LEFT) | − | − | − | MONITORING TARGET |

POWER RECEIVING PAD REAR SIDE &
ON REARWARD START OF MOVEMENT

| AT TIME OF REARWARD MOVEMENT | LEFT FRONT WHEEL | RIGHT FRONT WHEEL | LEFT REAR WHEEL | RIGHT REAR WHEEL |
|---|---|---|---|---|
| $+\theta$ (STEERING WHEEL TURNED TO RIGHT) | – | MONITORING TARGET | – | – |
| $-\theta$ (STEERING WHEEL TURNED TO LEFT) | MONITORING TARGET | – | – | – |

204

VEHICLE

CROSS-REFERENCE TO RELATED APPLICATION

This application is based upon and claims the benefit of priority from Japanese Patent Application No. 2015-034983 filed on Feb. 25, 2015, the contents of which are incorporated herein by reference.

BACKGROUND OF THE INVENTION

Field of the Invention

The present invention relates to a vehicle including a non-contact charging device for charging a storage battery with electric power by non-contact charging in which the electric power supplied from a power supplying coil is received by a power receiving coil in a non-contact manner.

Description of the Related Art

In Japanese Laid-Open Patent Publication No. 2003-191809 (hereinafter referred to as "JP2003-191809A"), there is disclosed a vehicle on which seven cameras are provided, which capture peripheral images of the vehicle on left and right front sides of the vehicle, left and right central sides of the vehicle, a central rear side of the vehicle, and left and right rear sides of the vehicle, around the periphery of the vehicle (refer to paragraph [0020] of JP2003-191809A).

With the vehicle equipped with the seven cameras, for example, it is disclosed that, when performing backward turning parking, the vehicle trajectory is predicted based on the steering angle, and in images from the camera on the rear center side of the vehicle, and the cameras on the left and right rear sides of the vehicle, by a display made on an image display device along with the predicted vehicle trajectory, a driver moves the vehicle along the vehicle trajectory while observing the image display device, whereby the vehicle can be parked in a desired parking spot while avoiding contact with obstacles (see paragraphs [0022], [0023] of JP2003-191809A).

SUMMARY OF THE INVENTION

In JP2003-191809A, although a technique is disclosed for predicting a vehicle trajectory based on the steering angle, there is no disclosure in relation to a vehicle equipped with a non-contact charging device.

With such a vehicle equipped with a non-contact charging device, charging of a storage battery of the vehicle is carried out in a non-contact condition, in which a power receiving coil of the vehicle, which is arranged on a bottom surface side of the vehicle, is placed face-to-face with a power supplying coil that is disposed on a road surface.

In this case, there is a problem in that the wheels of the vehicle, when the vehicle starts to move again after completion of non-contact charging, may drive over the power supplying coil, thus causing damage to the power supplying coil. However, with the technique of JP2003-191809A in which cameras are disposed around the vehicle periphery, in the case that the power supplying coil is disposed underneath the vehicle, since an image of the power supplying coil cannot be displayed on the display device, the aforementioned problem cannot be solved.

The present invention has been devised taking into consideration the aforementioned problems, and has the object of providing a vehicle equipped with a non-contact charging device, which at a time that the vehicle starts to move after completion of non-contact charging, is capable of preventing damage from occurring to a power supplying coil by the wheels of the vehicle driving over the power supplying coil.

A vehicle according to the present invention has a storage battery, which is charged with electric power by non-contact charging, wherein the power is supplied from a power supplying coil, and is received by a power receiving coil in a non-contact manner. The vehicle includes a stopped position estimating unit configured to estimate a stopped position of the vehicle, and determine a stopped position estimation value from a positional shift amount of the power receiving coil with respect to the power supplying coil at a time of non-contact charging, a drive over estimating unit configured to estimate whether or not wheels of the vehicle will drive over the power supplying coil, from the stopped position estimation value and a steering angle, when the vehicle starts to move after non-contact charging is completed, and a notification unit configured to issue a notification when it is estimated that the wheels of the vehicle will drive over the power supplying coil.

According to the present invention, at a time that a vehicle starts to move after completion of non-contact charging, it is possible to prevent damage from occurring to the power supplying coil as a result of the wheels of the vehicle driving over the power supplying coil.

In this case, preferably, the drive over estimating unit switches the wheels, which are targets to be monitored for driving-over, based on a steering direction and a vehicle movement direction. Based on the steering direction and the vehicle movement direction, by specifying only wheels that have a high possibility of driving over the power supplying coil, and regarding such wheels as target wheels to be monitored for drive over estimation, the control load can be reduced.

Moreover, after the vehicle starts to move, the drive over estimating unit preferably continues to perform a drive over estimating process until a relative distance between the power supplying coil and the power receiving coil becomes greater than or equal to a predetermined distance. Owing to the above, the drive over determination process continues to be performed if the relative distance remains within the predetermined distance. Thus, while the driver is turning the steering wheel to the left and right any number of times in order to move the vehicle away from the charging spot, the drive over determination process is continuously performed with the wheels that are the target of monitoring being switched from one to the other based on the steering angle and the vehicle movement direction, whereby damage to the power supplying coil caused by driving over thereof can reliably be prevented.

Further, when the power receiving coil is disposed on a rear side of the vehicle, the drive over estimating unit preferably sets a drive over estimation region with respect to the steering angle or the stopped position estimation value, such that the drive over estimation region in a case that the vehicle starts to move in a rearward direction after completion of non-contact charging is set to be greater than the drive over estimation region in a case that the vehicle starts to move in a forward direction thereafter. With a vehicle in which the power receiving coil is arranged on the rear side of the vehicle, driving over of the power supplying coil can reliably be prevented at a time that the vehicle starts to move in a rearward direction when the possibility for the power supplying coil to be driven over is high. Together therewith, it is possible to suppress the driving over possibility from being notified needlessly (excessively) at a time that the vehicle starts to move in a forward direction when the possibility for the power supplying coil to be driven over is low.

Furthermore, when the power receiving coil is disposed on a front side of the vehicle, the drive over estimating unit sets a drive over estimation region with respect to the steering angle or the stopped position estimation value, such that the drive over estimation region in a case that the vehicle starts to move in a forward direction after completion of non-contact charging is set to be greater than the drive over estimation region in a case that the vehicle starts to move in a rearward direction thereafter. With a vehicle in which the power receiving coil is arranged on the front side of the vehicle, driving over of the power supplying coil can reliably be prevented at a time that the vehicle starts to move in a forward direction when the possibility for the power supplying coil to be driven over is high. Together therewith, it is possible to suppress the driving over possibility from being notified needlessly (excessively) at a time that the vehicle starts to move in a rearward direction when the possibility for the power supplying coil to be driven over is low.

According to the present invention, the drive over estimating unit estimates whether or not the wheels of the vehicle will drive over the power supplying coil, from the stopped position estimation value and the steering angle, at the time that the vehicle starts to move after non-contact charging is completed, and the notification unit issues a notification when it is estimated that the wheels of the vehicle will drive over the power supplying coil. Thus, an advantageous effect is realized in that it is possible to prevent damage from occurring to the power supplying coil as a result of the wheels of the vehicle driving over the power supplying coil at the time that the vehicle starts to move after non-contact charging is completed.

The above and other objects features and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a flowchart for providing a description of operations of the electric vehicle;

FIG. 6A is a schematic plan view showing a time when the electric vehicle is stopped with a power receiving pad being disposed on a front side of the vehicle;

FIG. 6B is a schematic plan view showing a time when the electric vehicle starts to move forwardly while steering right, with a power receiving pad being disposed on a front side of the vehicle;

FIG. 6C is a schematic plan view showing a time when the electric vehicle starts to move forwardly while steering left, with a power receiving pad being disposed on a front side of the vehicle;

FIG. 8 is an explanatory diagram for describing wheels which are a target of monitoring at a time that the electric vehicle starts to move forwardly, with a power receiving pad being disposed on a front side of the vehicle;

FIG. 9 is an explanatory diagram for describing wheels which are a target of monitoring at a time that the electric vehicle starts to move rearwardly, with a power receiving pad being disposed on a rear side of the vehicle;

DESCRIPTION OF THE PREFERRED EMBODIMENTS

Below, a preferred embodiment of a vehicle according to the present invention will be described in detail with reference to the accompanying drawings.

Figure 1:
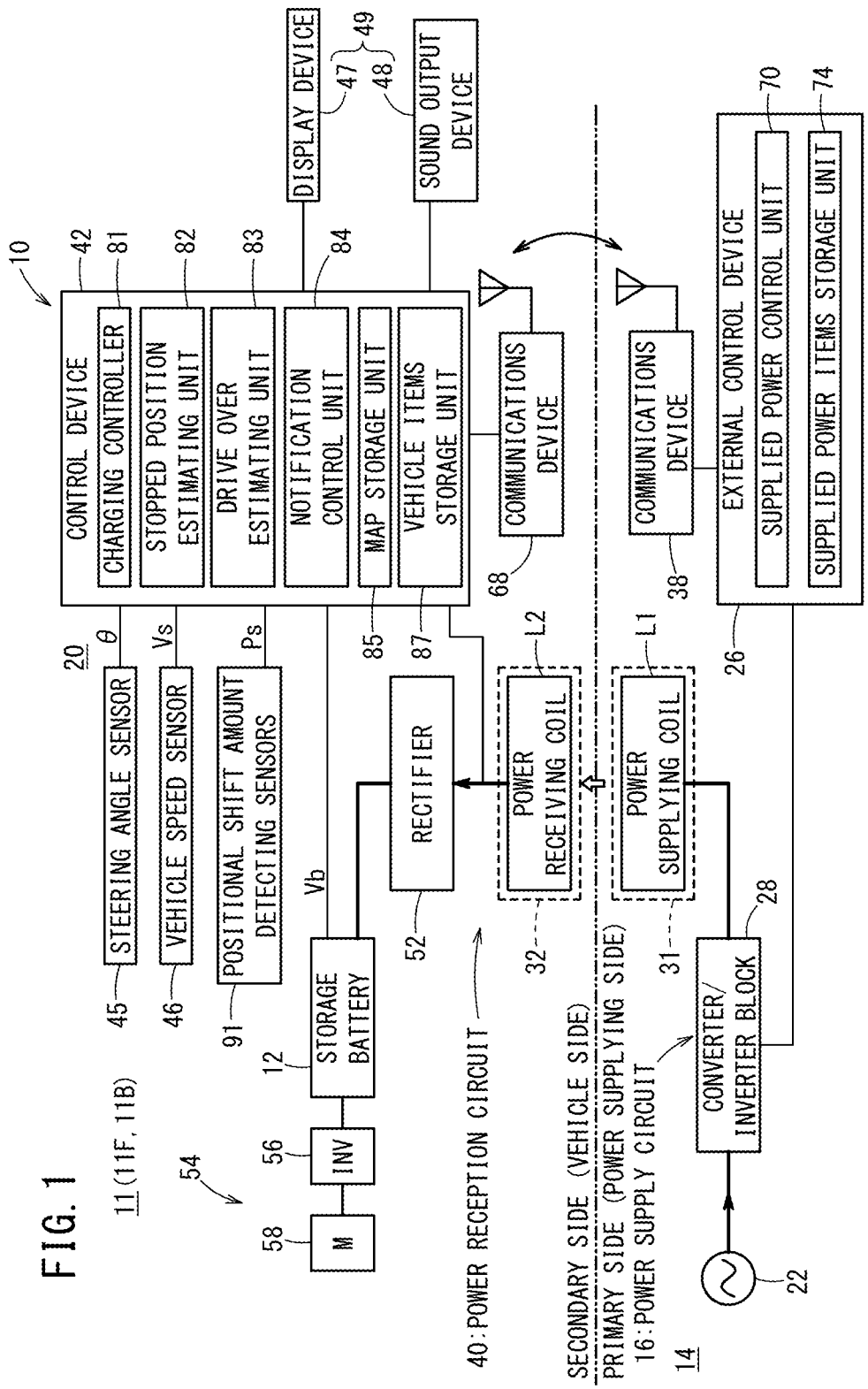
FIG. 1 is an outline schematic diagram of a non-contact charging system containing an electric vehicle as a vehicle according to an embodiment of the present invention, and an external power supplying device.

In FIG. 1, there is shown an outline schematic diagram of a non-contact charging system 20 comprising an electric vehicle 11 as a vehicle according to the present embodiment, and an external power supplying device 14 that charges in a non-contact manner a storage battery 12 made up from a lithium ion battery or the like which is mounted in the electric vehicle 11. In FIG. 1, the constituent elements on the upper side of the two-dot-dashed line form a secondary side (vehicle side), i.e., the electric vehicle 11 having a non-contact charging device 10, and the constituent elements on the lower side of the two-dot-dashed line form a primary side (power supplying side), i.e., the external power supplying device 14.

According to the present embodiment, as a non-contact power transmission system, although a magnetic resonance system is described as an example, the present invention can also be applied to a non-contact charging system using electromagnetic induction, instead of such a magnetic resonance system.

In FIG. 1, the external power supplying device 14, which forms the primary side (power supplying side), basically is constituted from a power supply circuit 16 and an external control device 26.

The power supply circuit 16 comprises an AC power source device 22, a converter/inverter block 28, and a power supplying antenna of the primary side (power supplying side), which is made up from a primary capacitor (not shown) and a power supplying coil (primary coil) L1 that serve as a resonant circuit.

The power supplying coil L1 is arranged at a predetermined height from the road surface (ground surface).

According to the present embodiment, the power supplying coil L1, which is constituted from a flat round coil, is arranged on the road surface (ground surface), in the form of a power supplying pad 31 having a flat rectangular parallelepiped shape (rectangular shape as viewed in plan).

The external control device 26 carries out drive controls (an ON/OFF control and a duty ratio variable control) of the converter/inverter block 28, which converts AC power supplied from the AC power source device 22 into the supplied electric power. A communications device 38 is connected to the external control device 26.

On the other hand, in addition to the storage battery 12, the electric vehicle 11 basically is constituted from a power reception circuit 40, which forms the secondary side (power receiving side, load side), a control device 42 that controls charging, etc., from the power supply circuit 16 to the storage battery 12, and a vehicle propulsion unit 54. The control device 42 may be divided into a storage battery control device, a so-called storage battery ECU (Electronic Control Unit), and a drive and charge control device ECU that controls the non-contact charging system 20 including driving of the electric vehicle 11 in its entirety.

The power reception circuit 40 is constituted from a power receiving antenna (power receiving side antenna) made up from a secondary capacitor (not shown) and a power receiving coil (secondary coil) L2 that serve as a resonance circuit, and a rectifier 52 that rectifies the received electric power (load power), which is an AC power received by the power receiving coil L2. The received electric power is detected by the control device 42.

According to the present embodiment, the power receiving coil L2, which is constituted from a flat round coil, is arranged on a lower surface of the electric vehicle 11, in the form of a power receiving pad 32 having a flat rectangular parallelepiped shape (substantially square shape as viewed in plan).

Next, as will be described, the power receiving pad 32 including the power receiving coil L2 is arranged on the front side of the electric vehicle 11 or the rear side of the electric vehicle 11.

Figure 2A:
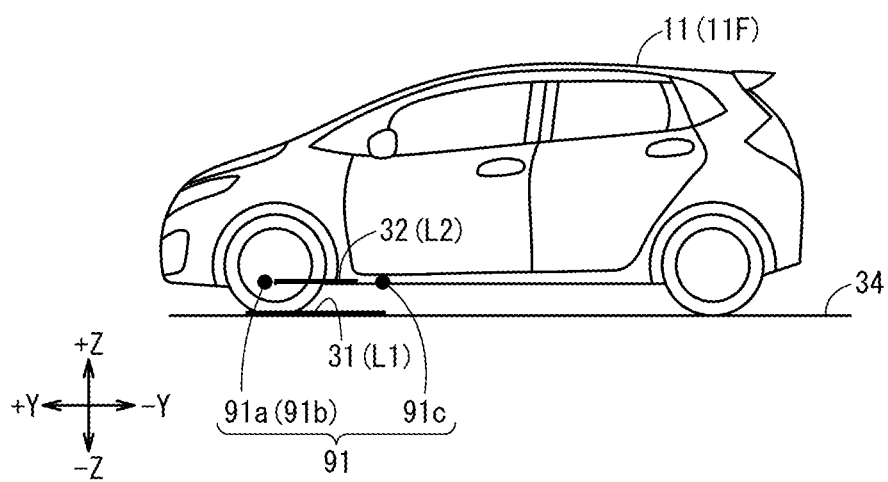
FIG. 2A is a schematic side view of an electric vehicle in which a power receiving coil is arranged on a front side of a bottom surface thereof.
Figure 2B:
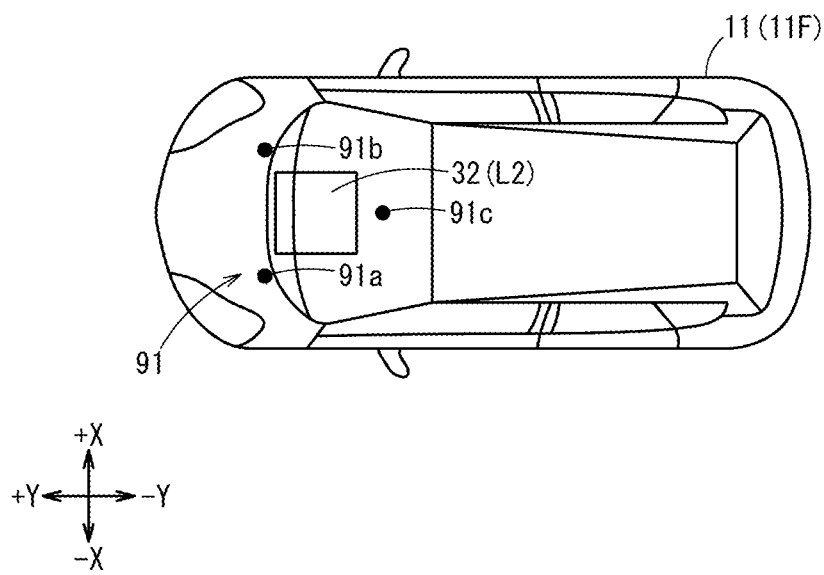
FIG. 2B is a schematic plan view of an electric vehicle in which a power receiving coil is arranged on a front side of a bottom surface thereof.

The schematic side view drawing of FIG. 2A and the schematic plan view drawing of FIG. 2B show an electric vehicle 11 (hereinafter referred to as an electric vehicle 11F) having a structure in which the power receiving pad 32 including the power receiving coil L2 is mounted on a front side of the bottom surface of the electric vehicle 11.

Figure 3A:
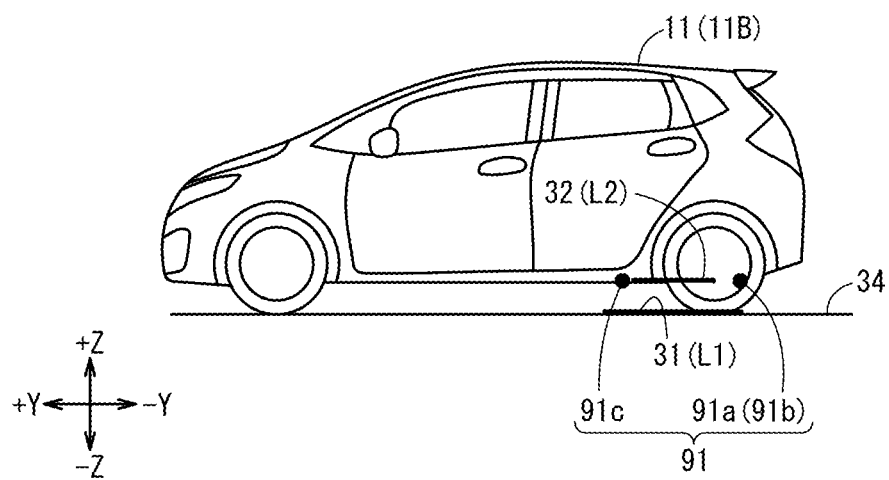
FIG. 3A is a schematic side view of an electric vehicle in which a power receiving coil is arranged on a rear side of a bottom surface thereof.
Figure 3B:
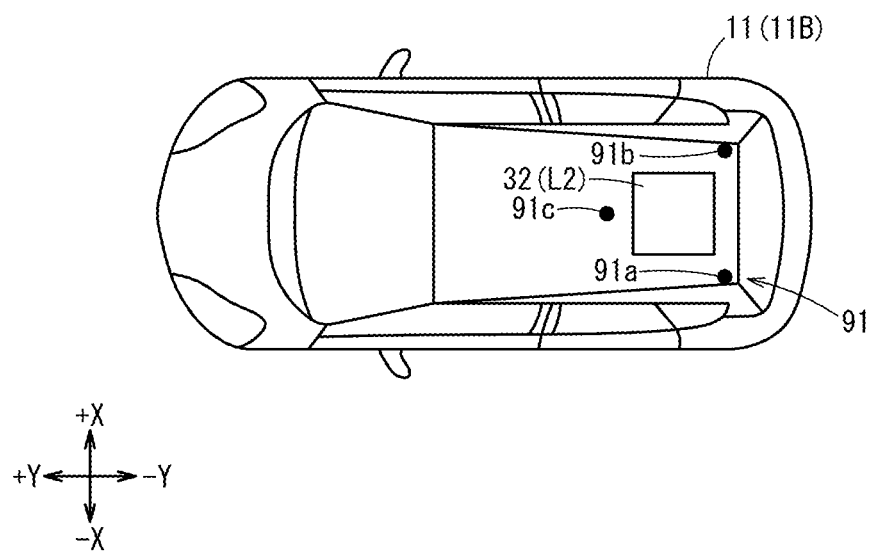
FIG. 3B is a schematic plan view of an electric vehicle in which a power receiving coil is arranged on a rear side of a bottom surface thereof.

The schematic side view drawing of FIG. 3A and the schematic plan view drawing of FIG. 3B show an electric vehicle 11 (hereinafter referred to as an electric vehicle 11B) having a structure in which the power receiving pad 32 including the power receiving coil L2 is mounted on a rear side of the bottom surface of the electric vehicle 11.

In accordance with the directions of the arrows shown in FIGS. 2A, 2B, 3A and 3B, the forward/rearward (longitudinal) directions (+Y, −Y), the left/right (lateral) directions (−X, +X), and the up/down directions (+Z, −Z) will be described.

As shown in FIGS. 2A and 2B, ultrasonic sensors 91a, 91b are mounted on both sides of the front side of the power receiving pad 32 (power receiving coil L2) on the electric vehicle 11F, and another ultrasonic sensor 91c is mounted substantially centrally in the vehicle width direction on a rear side of the power receiving pad 32 (power receiving coil L2) on the electric vehicle 11F. The three ultrasonic sensors 91a to 91c constitute positional shift amount detecting sensors 91 that detect the amount of positional shifting Ps of the power receiving pad 32 (power receiving coil L2) with respect to the power supplying pad 31 (power supplying coil L1) when the vehicle is stopped (during non-contact charging). The positional shift amount detecting sensors 91, instead of the ultrasonic sensors 91a to 91c, can be replaced by a laser range finder, a camera, or the like. The power supplying pad 31 (power supplying coil L1) as a primary pad is arranged on the road surface (ground surface) 34.

As shown in FIGS. 3A and 3B, ultrasonic sensors 91a, 91b are mounted on both sides of the rear side of the power receiving pad 32 (power receiving coil L2) on the electric vehicle 11B, and another ultrasonic sensor 91c is mounted substantially centrally in the vehicle width direction on a front side of the power receiving pad 32 on the electric vehicle 11B. The three ultrasonic sensors 91a to 91c constitute positional shift amount detecting sensors 91 that detect the amount of positional shifting Ps of the power receiving pad 32 (power receiving coil L2) with respect to the power supplying pad 31 (power supplying coil L1) when the vehicle is stopped (during non-contact charging). The positional shift amount detecting sensors 91, instead of the ultrasonic sensors 91a to 91c, can be replaced by a laser range finder, a camera, or the like. The power supplying pad (primary pad) 31 is arranged on the road surface (ground surface) 34.

In FIGS. 2A and 3A, the power supplying pad 31 is common to both illustrations.

As shown in FIG. 1, the vehicle propulsion unit 54, which is controlled by the control device 42, is connected to the storage battery 12. The vehicle propulsion unit 54 comprises an inverter 56 that converts a voltage (storage battery voltage) Vb of the storage battery 12 into an alternating current, a motor-generator 58 for vehicle propulsion that is driven by the inverter 56, and a transmission (not shown) that transmits rotary power from the motor-generator 58 to the drive wheels (not shown).

In addition to an electric vehicle or a so-called EV, which is driven only by the storage battery 12, the electric vehicle 11 according to the present invention may be any vehicle which is capable of being charged by external electric power, such as a hybrid vehicle equipped with an engine, a range extender vehicle, and a fuel cell vehicle equipped with a fuel cell, etc.

The non-contact charging device 10 includes the control device 42. In addition to the storage battery 12 and the power receiving coil L2, a communications device 68, which carries out wireless communications with the communications device 38 of the external control device 26, is connected to the control device 42.

To the control device 42, in addition to the aforementioned positional shift amount detecting sensors 91, there are connected a steering angle sensor 45 provided on a steering wheel shaft (not shown) and which detects a steering angle θ, a vehicle speed sensor 46 that detects the vehicle speed Vs, a display device 47 such as a liquid crystal display device or the like, and a sound output device 48 such as a speaker or the like. A notification unit 49 is formed by the display device 47 and the sound output device 48. The display device 47 can also make use of a display device for a navigation device or a display device for a display/audio unit or the like.

The control device 42 and the external control device 26 are each constituted by ECUs, respectively. Each of the ECUs is a calculating device including a microcomputer, which includes a central processing unit (CPU), a ROM (including an EEPROM) and a RAM (random access memory) as memories, input/output devices such as an A/D converter, a D/A converter, and the like, and a timer that functions as a timing unit. By the CPU reading out and executing programs stored in the ROMs, the ECUs function as various function realizing units (function realizing means), for example, a controller, a computation unit, and a processing unit, etc.

In the present embodiment, the external control device 26 that makes up the external power supplying device 14 functions as a supplied power control unit 70 for performing a PWM (Pulse Width Modulation) drive control, which is a duty ratio control, of the converter/inverter block 28. In the external control device 26, there is included a supplied power items storage unit 74 in which there are stored characteristics of the power supplying coil L1, specifications of the power supplying pad 31 (size: length×width×height, also referred to as power supplying pad size), and the supplied electric power.

On the other hand, the control device 42 that makes up the non-contact charging device 10 comprises a charging controller 81, a stopped position estimating unit 82, a drive over estimating unit 83, a notification control unit 84, a map (characteristics) storage unit 85, and a vehicle items storage unit 87 in which there are stored various items concerning the electric vehicle 11.

When the vehicle is parked (stopped) for the purpose of carrying out non-contact charging, among the ultrasonic sensors 91a to 91c, in accordance with outputs of the ultrasonic sensors 91a, 91b, a left/right shift amount (−X, +x) of the (center of gravity of the surface of the) power receiving pad 32, i.e., the (center of gravity of the surface of the) power receiving coil L2, with respect to the (center of gravity of the surface of the) power supplying pad 31, i.e., the (center of gravity of the surface of the) power supplying coil L1, is calculated in the positional shift amount detecting sensors 91, and together therewith, in accordance with outputs of the ultrasonic sensors 91a, 91c or outputs of the ultrasonic sensors 91b, 91c, a front/rear shift amount (+Y, −Y) of the (center of gravity of the surface of the) power receiving pad 32, i.e., the (center of gravity of the surface of the) power receiving coil L2, with respect to the (center of gravity of the surface of the) power supplying pad 31, i.e., the (center of gravity of the surface of the) power supplying coil L1, is calculated in the positional shift amount detecting sensors 91.

Figure 4:
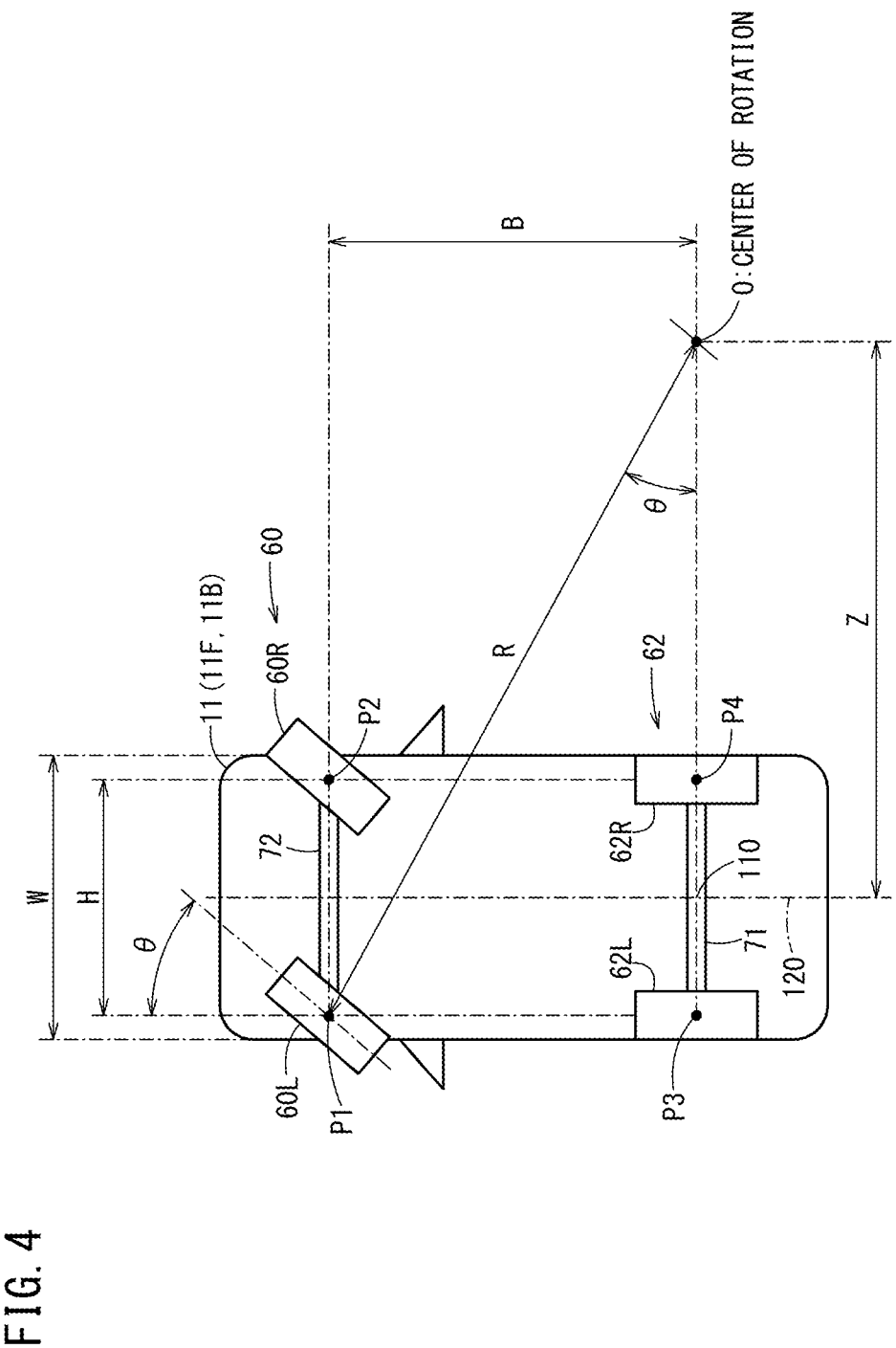
FIG. 4 is a schematic plan view for providing a description of various data items in relation to the electric vehicle.

FIG. 4 is a schematic plan view for providing a description of various data items in relation to the electric vehicle 11, which are stored in the vehicle items storage unit 87.

The various data items that are stored in the vehicle items storage unit 87, includes the total width (vehicle width) W of the electric vehicle 11, the wheel base B between the front wheel axle 72 and the rear wheel axle 71, the tread H, the size of the front wheels (in this case the steered wheels) 60 made up from the left front wheel 60L and the right front wheel 60R, and the size of the rear wheels 62 made up from the left rear wheel 62L and the right rear wheel 62R. The data items further includes the positional coordinates of the power receiving pad 32 including the power receiving coil L2, wherein the center position (rear wheel axle center position) 110 of the rear wheel axle 71 defines a coordinate origin, and the positional coordinates, etc., of the power receiving pad 32 including the power receiving coil L2, with respect to the (ground-contact position P1 of the) left front wheel 60L, the (ground-contact position P2 of the) right front wheel 60R, the (ground-contact position P3 of the) left rear wheel 62L, and the (ground-contact position P4 of the) right rear wheel 62R.

In FIG. 4, the distance Z to the center of rotation O from the rear wheel axle center position 110 on a vehicle center axial line 120 and the turning radius R can be determined from the steering angle θ. Thus, by detecting the steering angle θ, the vehicle speed Vs, and the starting direction (forward direction or rearward direction), the trajectories of the front wheels 60 and the rear wheels 62 can be estimated.

Further, from FIG. 4 and onward, in the drawings that depict the electric vehicle 11, the triangular shapes drawn on the rearward sides of the left front wheel 60L and the right front wheel 60R are schematic representations of the door mirrors.

Next, with reference to the flowchart of FIG. 5, drive over avoidance (preventative) operations of the front wheels 60 and the rear wheels 62 of the electric vehicle 11 (electric vehicle 11F, electric vehicle 11B), which is configured in the foregoing manner, with respect to the power supplying pad 31 (power supplying coil L1) will be described.

In step S1, parking of the vehicle is initiated in order to position the power receiving pad 32 of the electric vehicle 11 with respect to the power supplying pad 31 on the road surface 34.

In step S2, during parking of the vehicle for the purpose of positioning, the charging controller 81 of the control device 42 acquires the power supplying pad size (length× width×height) of the power supplying pad 31 through the communications devices 38, 68 from the supplied power items storage unit 74 of the external control device 26. Further, in step S2, the charging controller 81 reads in from the vehicle items storage unit 87 various information concerning the vehicle, such as the wheel base B, the total width W, and the relative positioning (respective distances from the ground-contact positions P1 to P4 of the front wheels 60 and the rear wheels 62 to the center of gravity (center) of the surface of the power receiving pad 32) and size (size of the power receiving pad 32: respective sizes of length and width) of the power receiving pad 32, etc.

In step S3, parking of the vehicle for the purpose of positioning is completed. Concerning completion of parking for the purpose of positioning, completion thereof is realized at a position of the electric vehicle 11 for which, for example, during slow speed traveling of the electric vehicle 11F in a forward direction, or during slow speed traveling of the electric vehicle 11B in a rearward direction, the transmission efficiency of electric power to the power receiving pad 32 from the power supplying pad 31 becomes maximum. The transmission efficiency is determined from the ratio of the received electric power to the supplied electric power, wherein the supplied electric power is transmitted from the power supplying coil L1 and obtained by the external control device 26, and the received electric power is received by the power receiving coil L2 and is detected by the control device 42.

In the case of the electric vehicle 11F in which the power receiving pad 32 is mounted on the front side of the vehicle, as shown in FIG. 6A, parking is completed in a state with the power receiving pad 32 including the power receiving coil L2 being placed face-to-face with the power supplying pad 31 including the power supplying coil L1. In this case, although parking is completed in the longitudinal (front/rear) direction Y at a position where the transmission efficiency of electric power is maximum (i.e., such that a center line perpendicular to the Y direction of the power supplying pad 31 and a center line perpendicular to the Y direction of the power receiving pad 32 coincide with each other), it should be noted that cases occur in which there is an offset to either the left or the right with respect to the vehicle center axial line 120, such that, in the transverse (left/right) direction X, a center line perpendicular to the X direction of the power supplying pad 31 and a center line perpendicular to the X direction of the power receiving pad 32 do not coincide.

Figure 7C:
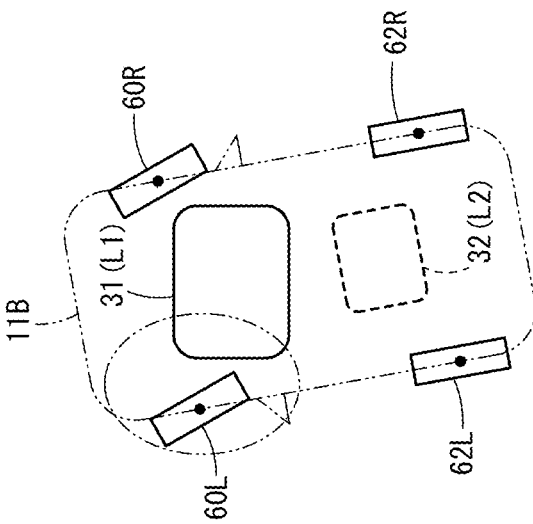
FIG. 7C is a schematic plan view showing a time when the electric vehicle starts to move rearwardly while steering left, with a power receiving pad being disposed on a rear side of the vehicle.
Figure 7B:
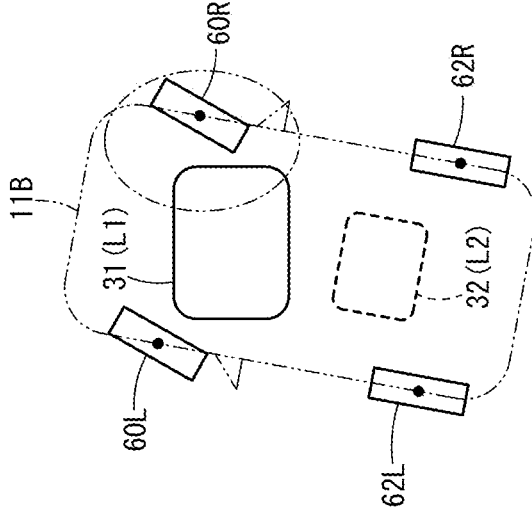
FIG. 7B is a schematic plan view showing a time when the electric vehicle starts to move rearwardly while steering right, with a power receiving pad being disposed on a rear side of the vehicle.
Figure 7A:
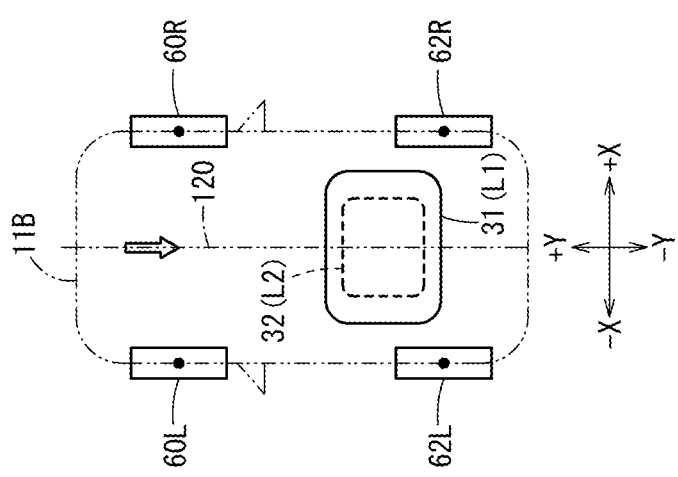
FIG. 7A is a schematic plan view showing a time when the electric vehicle is stopped with a power receiving pad being disposed on a rear side of the vehicle.

Similarly, in the case of the electric vehicle 11B in which the power receiving pad 32 is mounted on the rear side of the vehicle, as shown in FIG. 7A, parking is completed in a state with the power receiving pad 32 including the power receiving coil L2 being placed face-to-face with the power supplying pad 31 including the power supplying coil L1. In this case as well, although parking is completed in the longitudinal (front/rear) direction Y at a position where the transmission efficiency of electric power is maximum (i.e., such that a center line perpendicular to the Y direction of the power supplying pad 31 and a center line perpendicular to the Y direction of the power receiving pad 32 coincide with each other), it should be noted that cases occur in which there is an offset to either the left or the right with respect to the vehicle center axial line 120, such that, in the transverse (left/right) direction X, a center line perpendicular to the X direction of the power supplying pad 31 and a center line perpendicular to the X direction of the power receiving pad 32 do not coincide.

In practice, in step S4, the relative positioning (amount of positional shift Ps) of the power receiving pad 32 with respect to the power supplying pad 31 is detected by the positional shift amount detecting sensors 91. Furthermore, in step S4, non-contact charging is carried out, whereby charging up to a predetermined remaining capacity is made with respect to the storage battery 12.

Next, in step S5, it is confirmed whether or not there is a request for start of movement of the electric vehicle 11. In this case, for example, the presence or absence of such a request can be confirmed based on whether or not a transition has occurred from an OFF state to an ON state of a non-illustrated ignition switch, or whether or not a transition of a shift position has occurred from a P (parking) position to an R (reverse) position or a D (drive) position.

If a request for start of movement is detected in step S5 (step S5: YES), then in step S6, it is detected that the electric vehicle 11 has started to move.

Next, in step S7, the vehicle speed Vs is detected by the vehicle speed sensor 46, together with detecting by the steering angle sensor 45 the (absolute value of the) steering angle θ and the steering direction D (i.e., whether the steering wheel is turned to the right (+θ) or is turned to the left (−θ), or whether the vehicle is traveling in a straight (forward or rearward, θ=0) direction).

In step S7, by periodically reading out the vehicle speed Vs detected by the vehicle speed sensor 46, and the steering angle θ and steering direction D detected by the steering angle sensor 45, the trajectory of the vehicle (i.e., the trajectory of the front wheels 60 and/or the rear wheels 62) is predicted, and the distance relationship between the power supplying pad 31 and the front wheels 60 and/or the rear wheels 62 is calculated.

In this case, at the time that the electric vehicle 11F, on which the power receiving pad 32 is mounted on the front side thereof, starts to move in a forward direction, by referring to a forward-start-of-movement monitoring target wheel map 202 shown in FIG. 8, a target vehicle wheel for drive over monitoring is specified from among the left front wheel 60L, the right front wheel 60R, the left rear wheel 62L, and the right rear wheel 62R, whereas at the time that the electric vehicle 11B, on which the power receiving pad 32 is mounted on the rear side thereof, starts to move in a rearward direction, by referring to a rearward-start-of-movement monitoring target wheel map 204 shown in FIG. 9, a target vehicle wheel for drive over monitoring is specified from among the left front wheel 60L, the right front wheel 60R, the left rear wheel 62L, and the right rear wheel 62R.

According to the forward-start-of-movement monitoring target wheel map 202, which is applied to the electric vehicle 11F on which the power receiving pad 32 is mounted on the front side of the vehicle, at the time that the vehicle starts to move in a forward direction, in the case that the steering wheel is turned to the right from the state shown in FIG. 6A and the steering direction D is +θ, then as shown in FIG. 6B, the left rear wheel 62L is specified as the wheel that is the target of drive over monitoring, whereas in the case that the steering wheel is turned to the left from the state shown in FIG. 6A and the steering direction D is −θ, then as shown in FIG. 6C, the right rear wheel 62R is specified as the wheel that is the target of drive over monitoring. The process of specifying the wheels that are the targets of drive over monitoring is carried out by the drive over estimating unit 83.

According to the rearward-start-of-movement monitoring target wheel map 204, which is applied to the electric vehicle 11B on which the power receiving pad 32 is mounted on the rear side of the vehicle, at the time that the vehicle starts to move in a rearward direction, in the case that the steering wheel is turned to the right from the state shown in FIG. 7A and the steering direction D is +θ, then as shown in FIG. 7B, the right front wheel 60R is specified as the wheel that is the target of drive over monitoring, whereas in the case that the steering wheel is turned to the left from the state shown in FIG. 7A and the steering direction D is −θ, then as shown in FIG. 7C, the left front wheel 60L is specified as the wheel that is the target of drive over monitoring.

Next, in step S8, the drive over estimating unit 83 reads in the drive over prediction maps from the map storage unit 85.

In FIGS. 10 through 14, drive over prediction maps 206, 208, 209, 210, and 212 are shown.

Figure 10:
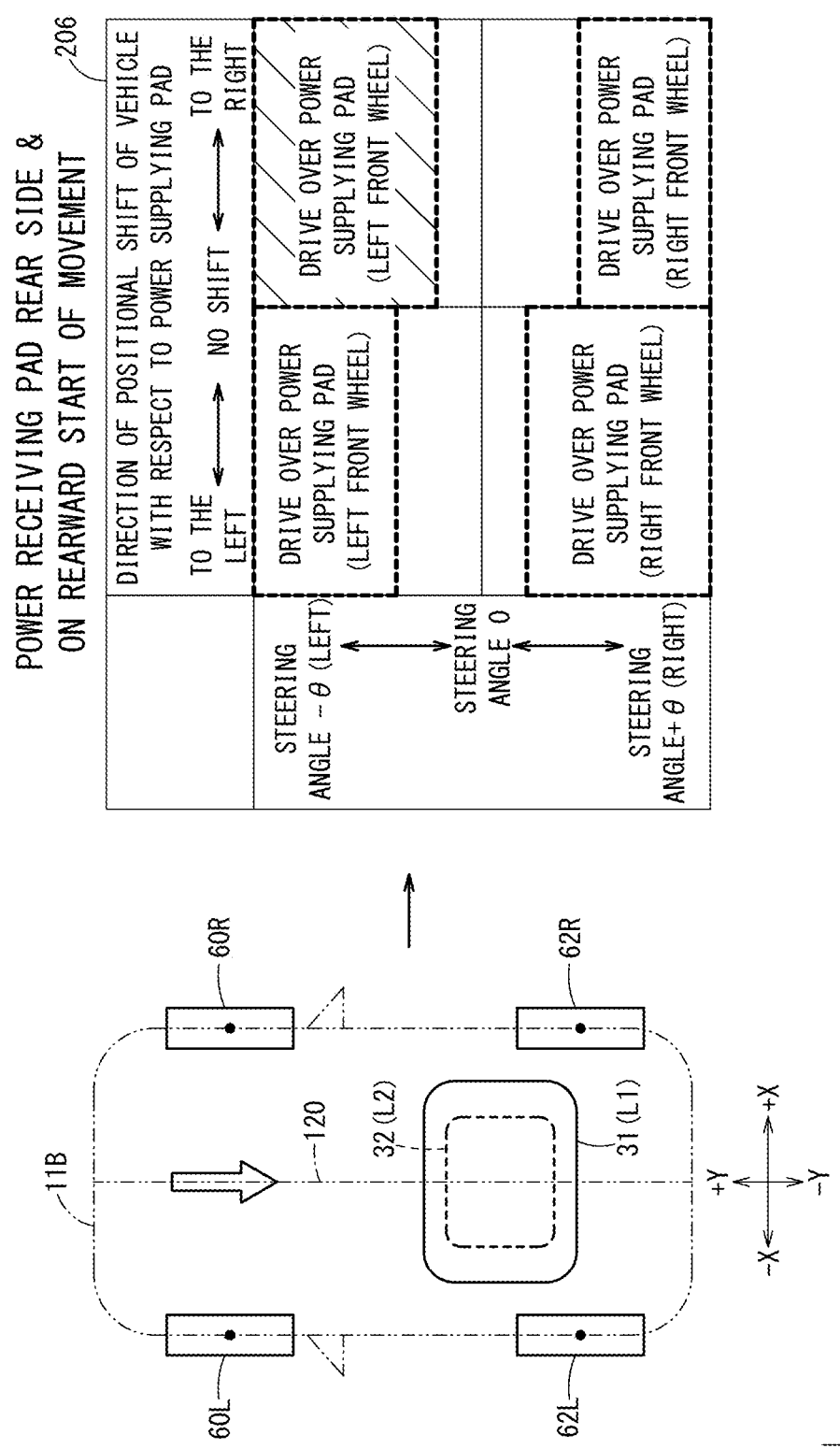
FIG. 10 is an explanatory diagram for describing a drive over prediction map at a time that the electric vehicle starts to move rearwardly, with a power receiving pad being disposed on a rear side of the vehicle.

The drive over prediction map 206 shown in FIG. 10 is read in at a time that the electric vehicle 11B on which the power receiving pad 32 is mounted on the rear side of the vehicle starts to move in a rearward direction. Inside the column marked "Direction of Positional Shift of Vehicle with Respect to Power Supplying Pad," the phrase "To the Left" implies that the vehicle center axial line 120 of the electric vehicle 11B is at a position of being shifted in a leftward direction (−X direction) with respect to the center of the power supplying pad 31, or stated otherwise, that the right front wheel 60R and the right rear wheel 62R are positioned nearer to the power supplying pad 31 than the left front wheel 60L and the left rear wheel 62L. The phrase "No Shift" implies that the vehicle center axial line 120 of the electric vehicle 11B coincides with the center of the power supplying pad 31, or stated otherwise, that the electric vehicle 11B is not shifted to the leftward direction or to the rightward direction. The phrase "To the Right" implies that the vehicle center axial line 120 of the electric vehicle 11B is at a position of being shifted in a rightward direction (+X direction) with respect to the center of the power supplying pad 31, or stated otherwise, that the left front wheel 60L and the left rear wheel 62L are positioned nearer to the power supplying pad 31 than the right front wheel 60R and the right rear wheel 62R.

In the drive over prediction map 206 of the power receiving pad rear side and at a time of rearward start of movement (FIG. 10), for example, as shown in the region indicated by hatching, it is implied that, in the case that the electric vehicle 11B is oriented to the right (the vehicle center axial line 120 is positioned rightward) even a little, when the steering direction D is −θ, even at a small steering angle of −θ, the left front wheel 60L has a high possibility of driving over the power supplying pad 31.

In the drive over prediction map 208 of the power receiving pad front side and at a time of rearward start of movement (FIG. 11), for example, as shown in the region indicated by hatching, it is implied that, in the case that the electric vehicle 11F is oriented to the right (the vehicle center axial line 120 is positioned rightward), when the steering angle θ becomes greater than or equal to a predetermined steering angle −θ, the left front wheel 60L has a high possibility of driving over the power supplying pad 31.

Figure 11:
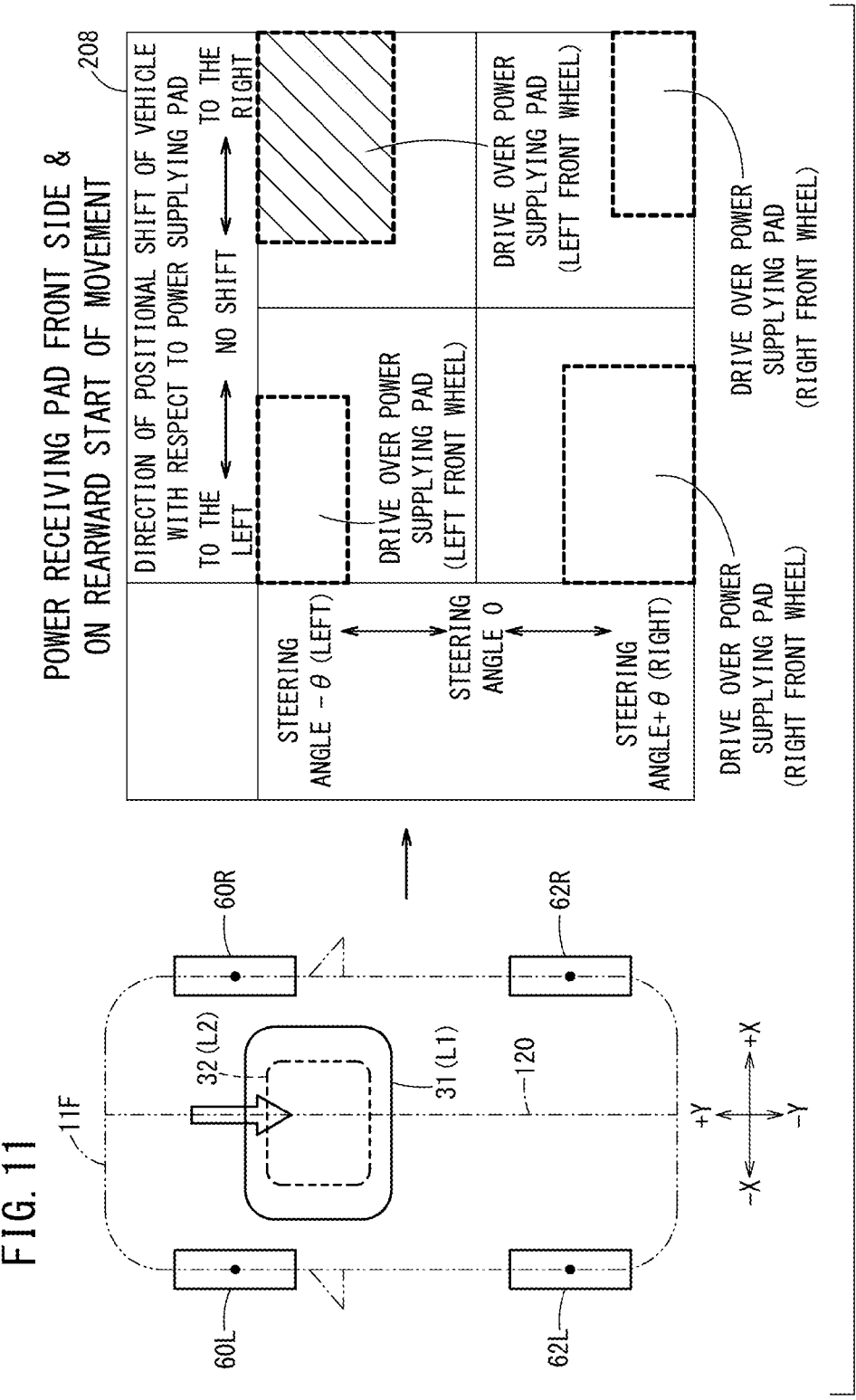
FIG. 11 is an explanatory diagram for describing a drive over prediction map at a time that the electric vehicle starts to move rearwardly, with a power receiving pad being disposed on a front side of the vehicle.
Figure 12:
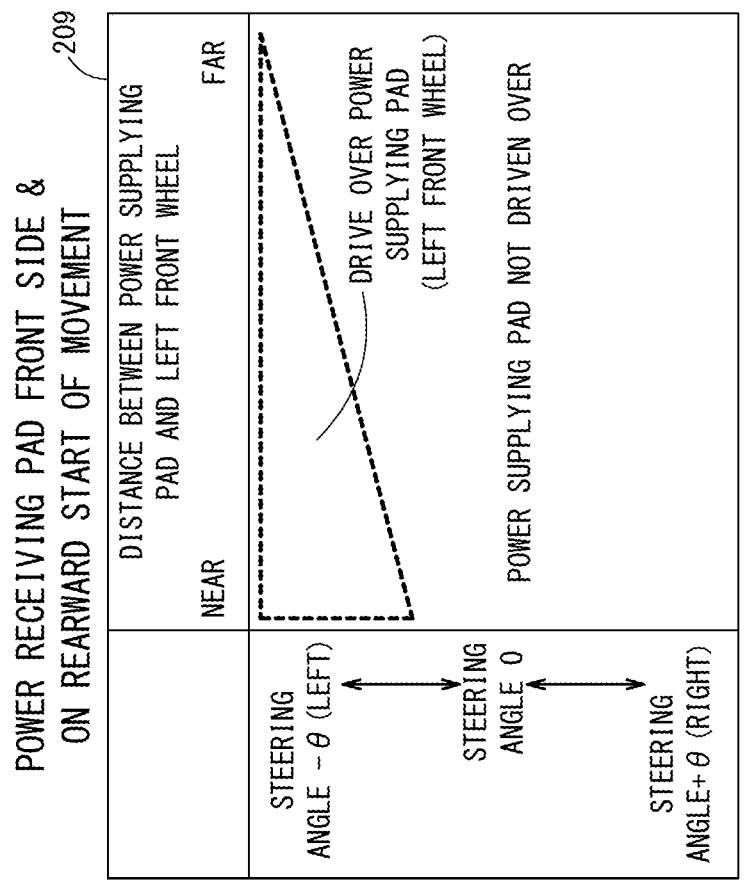
FIG. 12 is a partially detailed explanatory diagram for describing a drive over prediction map at a time that the electric vehicle starts to move rearwardly, with a power receiving pad being disposed on a front side of the vehicle.
Figure 13:
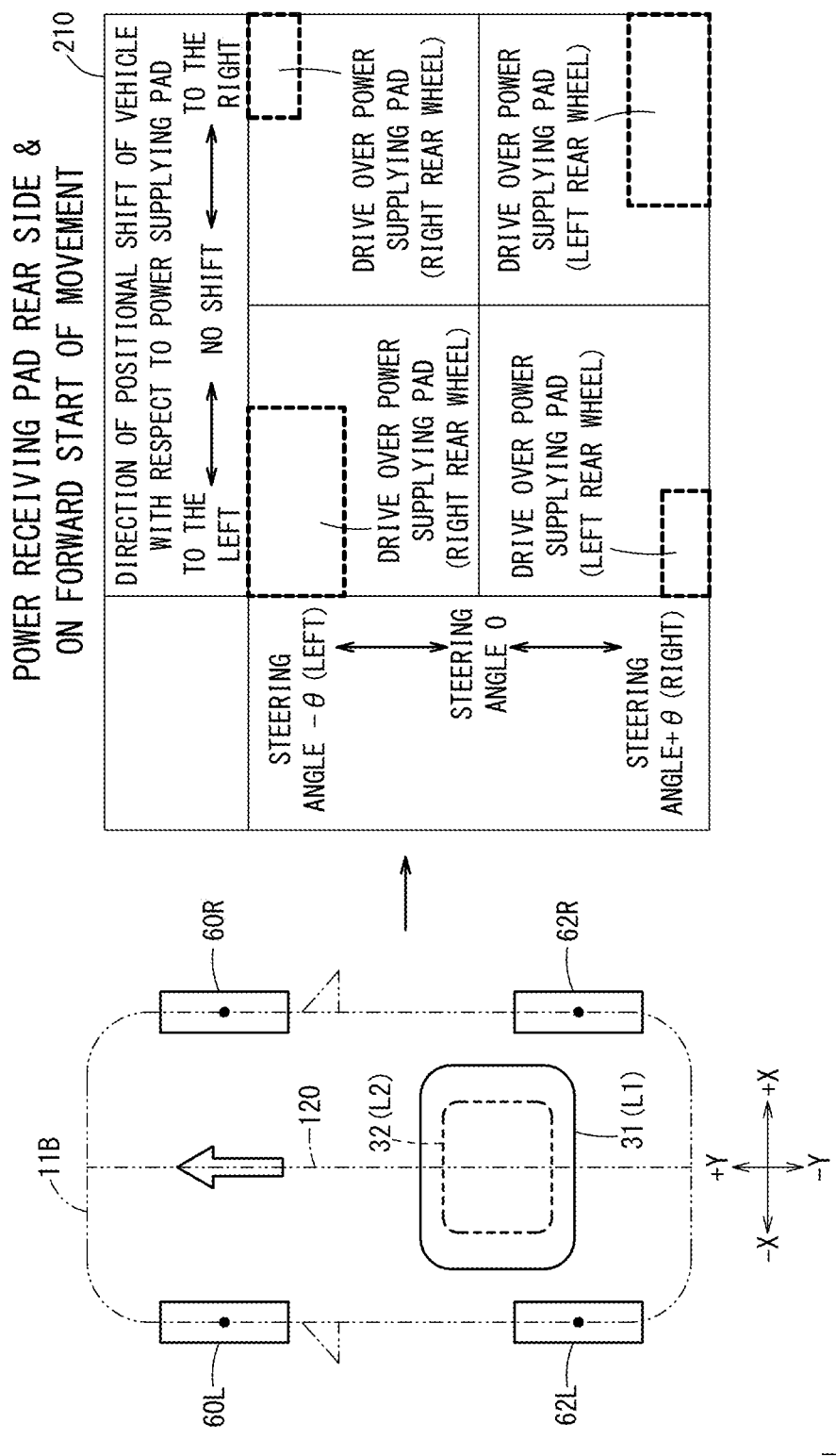
FIG. 13 is an explanatory diagram for describing a drive over prediction map at a time that the electric vehicle starts to move forwardly, with a power receiving pad being disposed on a rear side of the vehicle.

In this case, according to the drive over prediction map 209 of the power receiving pad front side and at a time of rearward start of movement, as shown in FIG. 12, in relation to the region indicated by hatching of FIG. 11, as the distance between the power supplying pad 31 and the left front wheel 60L becomes closer, or stated otherwise, as the rightward amount as an amount of positional shifting of the electric vehicle 11F becomes greater, it is understood to indicate that it is easy for the left front wheel 60L to drive over the power supplying pad 31.

From the drive over prediction maps 206, 208, 209 of the power receiving pad rear/front side and at a time of rearward start of movement, at a time of rearward start of movement for which there is a possibility for the front wheels 60 to drive over the power supplying pad 31, it can be estimated from the steering angle θ and the steering direction D [left (−), right (+)] of the front wheels 60 whether or not driving over by the front wheels 60 will occur.

Similarly, from the drive over prediction maps 210 (FIG. 13) and 212 (FIG. 14) of the power receiving pad rear/front side and at a time of forward start of movement, at a time of forward start of movement for which there is a possibility for the rear wheels 62 to drive over the power supplying pad 31, the vehicle trajectory of the rear wheels 62 (left rear wheel 62L, right rear wheel 62R) can be estimated from the steering angle θ and the steering direction D [left (−), right (+)] of the front wheels 60, and from the vehicle speed Vs, and thus it is possible to estimate whether or not driving over will occur.

Next, in step S9, it is determined whether no possibility exists for driving over to occur, and if it is judged that there is a possibility for driving over to occur (step S9: NO), then in step S10, the notification control unit 84 issues a notification (warning) to the driver by displaying on the display device 47 the schematic image shown in FIG. 6B, FIG. 6C or FIG. 7B, FIG. 7C. At the same time, through the sound output device 48, for example, in the case there is a possibility for the front wheels 60 to drive over the power supplying pad 31 at a time of rearward movement of the vehicle, temporarily, information (a warning) is issued to prompt the driver to move the electric vehicle 11 forward, whereas, in the case there is a possibility for the rear wheels 62 to drive over the power supplying pad 31 at a time of forward movement of the vehicle, information (a warning) is issued to prompt the driver to move the electric vehicle 11 rearward.

Next, in step S11, the change in position of the electric vehicle 11 (a forward or rearward operation which the driver performs with respect to the electric vehicle 11 in accordance with the warning) is detected, whereupon the process returns to step S7. The processes of step S7 and step S8 are repeated until the judgment of step S9 becomes positive.

In step S9, if it is judged that there is no possibility for driving over to occur (step S9: YES), then in step S12, the relative positioning between the power supplying pad 31 and the wheels that are the target of monitoring (front wheels 60 or rear wheels 62) is updated.

Next, in step S13, the processes of step S7 and the steps thereafter are repeated until the relative distance between the power supplying pad 31 and the target wheel to be monitored (the front wheels 60 or the rear wheels 62) becomes greater than or equal to a threshold value (threshold distance, predetermined distance). Further, in the case that the relative distance between the power supplying pad 31 and the target wheel to be monitored (the front wheels 60 or the rear wheels 62) is greater than or equal to the threshold value (threshold distance, predetermined distance) (step S13: Yes), the process is brought to an end.

Summary of Embodiment

According to the present embodiment, in the electric vehicle 11 (11F, 11B) having a storage battery 12, which is charged with electric power by non-contact charging, in which the electric power supplied from a power supplying coil L1 is received by the power receiving coil L2 in a non-contact manner, the stopped position estimating unit 82 estimates a stopped position of the electric vehicle 11 from the positional shift amount Ps of the power receiving coil L2 (power receiving pad 32) with respect to the power supplying coil L1 (power supplying pad 31) at the time of non-contact charging, and determines, as a stopped position estimation value, a deviation amount (to the left side or the right side) [cm] of a vehicle center axial line 120 with respect to the power supplying coil L1 (power supplying pad 31).

Next, the drive over estimating unit 83 estimates whether or not the wheels 60, 62 of the electric vehicle 11 will drive over the power supplying coil L1 (power supplying pad 31) from the stopped position estimation value (a deviation amount in a direction of positional shifting of the electric vehicle 11 with respect to the power supplying pad 31) and the steering angle, [−θ (left) or +θ (right)] when the vehicle starts to move after non-contact charging thereof is completed.

The notification unit 49 issues a notification when it is estimated that the wheels 60, 62 of the electric vehicle 11 will drive over the power supplying coil L1 (power supplying pad 31). Moreover, the notification unit 49 may use at least one of the display device 47 and the sound output device 48. The sound output device 48 may output a voice audio or a buzzer sound (the sound intensity period of which becomes shorter as the possibility of driving over becomes higher).

In this manner, according to the present embodiment, at a time that the electric vehicle 11 starts to move after completion of non-contact charging, it is possible to prevent damage from occurring to the power supplying coil L1 (power supplying pad 31) as a result of the wheels 60, 62 of the electric vehicle 11 driving over the power supplying coil L1 (power supplying pad 31).

Preferably, the drive over estimating unit 83 switches (specifies) the wheels 60, 62, which are targets of drive over monitoring, by referring to a forward-start-of-movement monitoring target wheel map 202 (FIG. 8) or a rearward-start-of-movement monitoring target wheel map 204 (FIG. 9), based on the steering direction D (whether left, right, or straight) and the vehicle movement direction (forward start of movement or rearward start of movement).

Based on the steering direction D and the vehicle movement direction (forward start of movement or rearward start of movement), by specifying only wheels (front wheels 60 or rear wheels 62) that have a high possibility of driving over the power supplying coil L1 (power supplying pad 31), and regarding such wheels as target wheels to be monitored for drive over estimation, the control load of the drive over estimating unit 83 of the control device 42 can be reduced.

In this case, after the electric vehicle 11 has started to move, the drive over estimating unit 83 preferably continues to perform the drive over estimating process until a relative distance between the power supplying coil L1 (power supplying pad 31) and the power receiving coil L2 (power receiving pad 32) is greater than or equal to a predetermined distance.

The drive over determination process continues to be performed if the relative distance remains within the predetermined distance. Thus, while the driver is turning the steering wheel to the left and right any number of times in order to move the electric vehicle 11 away from a charging spot after completion of non-contact charging, the drive over determination process is continuously performed with the wheels (front wheels 60, rear wheels 62) that are the target of monitoring being switched from one to the other based on the steering angle +θ, −θ and the vehicle movement direction (forward start of movement or rearward start of movement), whereby damage to the power supplying coil L1 (power supplying pad 31) caused by driving over thereof can reliably be prevented.

In the case of the electric vehicle 11B on which the power receiving coil L2 is disposed on a rear side of the vehicle, the drive over estimating unit 83 preferably sets a drive over estimation region with respect to the steering angle +θ, −θ or the stopped position estimation value (i.e., a deviation or offset amount (to the left side or to the right side) [cm] of the vehicle center axial line 120 with respect to the power supplying coil L1 (power supplying pad 31)), such that the drive over estimation region in the case that the vehicle starts to move in a rearward direction after completion of non-contact charging is set to be greater than the drive over estimation region in the case that the vehicle starts to move in a forward direction thereafter, for example, as shown by hatching in the drive over prediction map 206 of the power receiving pad rear side and at a time of rearward start of movement of FIG. 10.

If configured in this manner, with the electric vehicle 11B in which the power receiving coil L2 (power receiving pad 32) is arranged on the rear side of the vehicle, driving over of the power supplying coil L1 (power supplying pad 31) can reliably be prevented at a time that the vehicle starts to move in a rearward direction when the possibility for the power supplying coil L1 (power supplying pad 31) to be driven over is high. Together therewith, it is possible to suppress the driving over possibility from being notified needlessly (excessively) at a time that the vehicle starts to move in a forward direction when the possibility for the power supplying coil L1 (power supplying pad 31) to be driven over is low.

Figure 14:
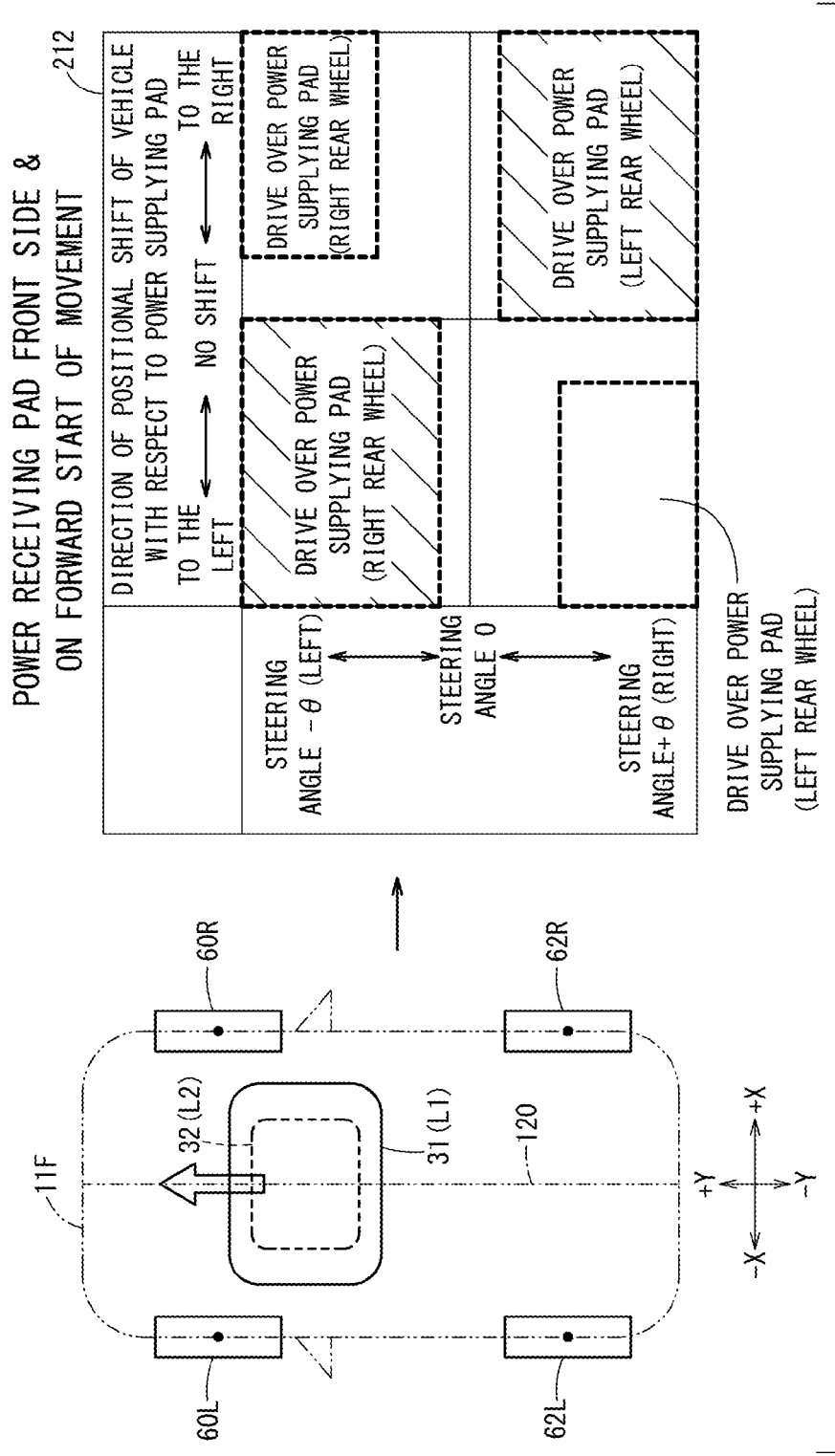
FIG. 14 is an explanatory diagram for describing a drive over prediction map at a time that the electric vehicle starts to move forwardly, with a power receiving pad being disposed on a front side of the vehicle.

Further, in the case of the electric vehicle 11F on which the power receiving coil L2 (power receiving pad 32) is disposed on a front side of the vehicle, the drive over estimating unit 83 preferably sets a drive over estimation region with respect to the steering angle +θ, −θ or the stopped position estimation value (i.e., a deviation or offset amount (to the left side or to the right side) [cm] of the vehicle center axial line 120 with respect to the power supplying coil L1 (power supplying pad 31)), such that the drive over estimation region in the case that the vehicle starts to move in a forward direction after completion of non-contact charging is set to be greater than the drive over estimation region in the case that the vehicle starts to move in a rearward direction thereafter, for example, as shown by hatching in the drive over prediction map 212 of the power receiving pad front side and at a time of forward start of movement of FIG. 14.

If configured in this manner, with the electric vehicle 11F in which the power receiving coil L2 (power receiving pad 32) is arranged on the front side of the vehicle, driving over of the power supplying coil L1 (power supplying pad 31) can reliably be prevented at a time that the vehicle starts to move in a forward direction when the possibility for the power supplying coil L1 (power supplying pad 31) to be driven over is high. Together therewith, it is possible to suppress the driving over possibility from being notified needlessly (excessively) at a time that the vehicle starts to move in a rearward direction when the possibility for the power supplying coil L1 (power supplying pad 31) to be driven over is low.

The present invention is not limited to the embodiment described above, and it is a matter of course that various additional or modified structures may be adopted therein based on the content disclosed in the present specification.

What is claimed is:

1. A vehicle having a storage battery which is charged with electric power by non-contact charging, the electric power being supplied from a power supplying coil fixed to a road and being received by a power receiving coil of the vehicle in a non-contact manner, the vehicle comprising:

a positional difference amount detecting sensor configured to detect a positional difference amount of the power receiving coil with respect to the power supplying coil at a time when the vehicle is stopped on the road and performs the non-contact charging of the electric power from the power supplying coil to the power receiving coil of the stopped vehicle, a stopped position estimating controller configured to estimate a stopped position of the vehicle, and determine a stopped position estimation value, by using the positional difference amount of the power receiving coil with respect to the power supplying coil at a time when the vehicle is stopped on the road and performs the non-contact charging of the electric power from the power supplying coil to the power receiving coil of the stopped vehicle;

a drive over estimating controller configured to estimate whether or not wheels of the vehicle will drive over the power supplying coil, from the stopped position estimation value and a steering angle, when the vehicle starts to move after the non-contact charging thereof; and a notification controller configured to issue a notification when it is estimated that the wheels of the vehicle will drive over the power supplying coil.

2. The vehicle according to claim 1, wherein the drive over estimating controller switches wheels which are targets to be monitored for driving-over, based on a steering direction and a vehicle movement direction.

3. The vehicle according to claim 1, wherein after the vehicle starts to move, the drive over estimating controller continues to perform a drive over estimating process until a relative distance between the power supplying coil and the power receiving coil becomes greater than or equal to a predetermined distance.

4. The vehicle according to claim 1, wherein the drive over estimating controller sets a drive over estimation region with respect to the steering angle or the stopped position estimation value; and when the power receiving coil is disposed on a rear side of the vehicle, in the drive over estimating controller, the drive over estimation region in a case that the vehicle starts to move in a rearward direction after the non-contact charging is set to be greater than the drive over estimation region in a case that the vehicle starts to move in a forward direction thereafter.

5. The vehicle according to claim 1, wherein the drive over estimating controller sets a drive over estimation region with respect to the steering angle or the stopped position estimation value; and when the power receiving coil is disposed on a front side of the vehicle, in the drive over estimating controller, the drive over estimation region in a case that the vehicle starts to move in a forward direction after the non-contact charging is set to be greater than the drive over estimation region in a case that the vehicle starts to move in a rearward direction thereafter.

6. The vehicle according to claim 1, wherein the positional difference amount detecting sensor is configured to detect of the positional difference amount of the power receiving coil with respect to the power supplying coil in a vehicle width direction.

7. The vehicle according to claim 6, wherein the positional difference amount detecting sensor includes a left sensor disposed on the left side of the power receiving coil and a right sensor disposed on the right side of the power receiving coil.

8. The vehicle according to claim 1, wherein the drive over estimating controller determines a wheel of the vehicle which has a possibility of driving over the power supplying coil when the vehicle starts to move based on the steering angle and a moving direction of vehicle, and monitor the wheel so as to reduce control load of the drive over estimating controller.

* * * * *